Oct. 29, 1935.  P. W. BACHMAN  2,019,038
PROCESS FOR DEARSENICATION OF SULPHURIC ACID
Filed Sept. 23, 1930
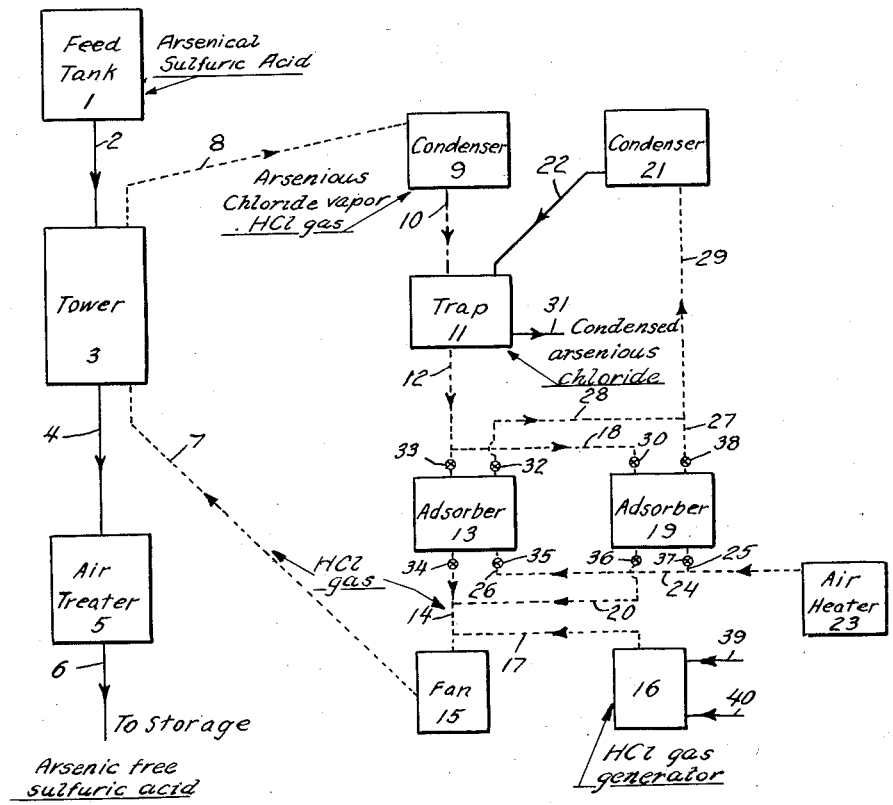
INVENTOR
Paul W. Bachman
BY
Forbes Silsby.
ATTORNEY Patented Oct. 29, 1935

2,019,038

UNITED STATES PATENT OFFICE 2,019,038

PROCESS FOR DEARSENICATION OF SULPHURIC ACID

Paul W. Bachman, New York, N. Y., assignor to General Chemical Company, New York, N. Y., a corporation of New York Application September 23, 1930, Serial No. 483,834

2 Claims. (Cl. 23—172)

This invention relates to a process for dearsenicating liquids, more particularly for the removal of arsenic from arsenical sulphuric acid, and includes correlated improvements and discoveries whereby dearsenication is accomplished.

The removal of arsenic from sulphuric acid has heretofore been attempted by treating the arsenical acid with hydrochloric acid, either in the form of a gas or as a liquid. In one of these methods the arsenical sulphuric acid, after being admixed with hydrochloric acid, is blown with air, whereby arsenious chloride, formed by reaction between the arsenic and hydrochloric acid, is removed. In another method the treatment of arsenical sulphuric acid with hydrochloric acid is carried out so that the arsenious chloride separates from the sulphuric acid as a lower oily layer. This lower layer is subsequently separated from the acid layer and treated to free it from selenium and to convert it into arsenic trioxide. These methods entail difficulties and are inefficient and uneconomical.

It is an object of this invention to provide a process for dearsenicating liquids which is efficient, economical, may be readily practiced commercially, and may be operated in a continuous manner.

Another object of the invention is to provide a process in accordance with which arsenic may be removed from a liquid in the form of a vaporous compound.

An additional object of the invention is to provide a process for freeing a liquid from arsenic by converting the arsenic into a halide.

A further object of the invention is to provide a process for removing arsenic from an arsenical sulphuric acid by the treatment thereof with a halogen acid, and thus obtaining an acid suitable as a raw material in various processes and which may be marketed without sacrifice.

In the practice of the invention arsenic may be removed from an arsenical liquid, for example, a sulphuric acid containing arsenic, by treating such liquid with a halogen acid by contacting the liquid, preferably counter-currently, with a halogen acid at a temperature sufficiently elevated to permit the ready evolution of the halide of arsenic ($AsX_3$ where X represents the halogen) formed. The halogen acids which I prefer to employ are hydrochloric and hydrofluoric acids. A suitable temperature is at least 150° F. I have found that the halide of arsenic formed, and passing off with the halogen acid gas may be selectively separated from said halogen acid gas by treatment with an adsorbent material, and the halogen acid remaining may be circulated in the gaseous phase back through the arsenical liquid without dilution of the gas with air or other extraneous gaseous material. The adsorption stage is preferably preceded by a condensation in which the major portion of the halide of arsenic may be removed, thus lessening the load on the adsorption stage.

Further, the removal of the arsenic will be more complete and the process more economically practiced if the liquid undergoing treatment is such that the halogen acid is not appreciably soluble therein. In the treatment of sulphuric acid I have found that a strong acid favors the removal of arsenic. Thus, for example, the arsenic may be more effectively removed upon treatment of an acid of 66° Bé. strength than an acid of lower concentration, for example 54° Bé. acid. In those instances in which economy is only of secondary importance, arsenical liquids may be treated in which the halogen acid is somewhat soluble, but in which it is not looked upon as a contaminating material.

The separation of the halide of arsenic from the gaseous stream containing such halide and the halogen acid gas by selective adsorption may be, as above indicated, preceded by condensation, and this may be effected in a chamber cooled by cooling water, for example at a temperature below the boiling point of the halide of arsenic, which temperature, in the event that arsenious chloride, which has a boiling point of 130° C., is the halide being separated, would be below this temperature. If the temperature difference between the cooled chamber and the boiling point of the halide of arsenic is considerable, then the vapor pressure of the halide will be lower and the amount passing from the chamber decreased. Thus, the condensation may be accomplished by cooling to a temperature at which the vapor pressure of the halide of arsenic is insufficient to materially affect the subsequent treatment of arsenical liquid with the halogen acid gas and this may be effected by artificial refrigeration if necessary. The adsorption of the halide of arsenic which is not separated by cooling may be occasioned by passing the gaseous stream from the condenser through an adsorbent material such as adsorbent carbons, silica gel, alumina gel, iron gel and similar adsorbents.

More particularly, the invention will now be described in connection with the dearsenication of a strong sulphuric acid, preferably of about 66° Bé. strength containing arsenic by means of hydrochloric acid, but it will be understood that the invention is not limited thereto.

Referring to the drawing in which the process is shown schematically, the arsenical sulphuric acid contained in a feed tank 1 is introduced by means of a pipe 2 into a treating tower 3. The treating tower may be filled with a suitable packing material in order to present an extended surface during the treatment with a halogen acid and to bring about intimate contact of the sulphuric acid therewith. In the treating tower the arsenical sulphuric acid is contacted with hydrochloric acid which may be introduced either as the liquid or in the gaseous form. The hydrochloric acid, for example, in gaseous form is introduced into the tower by means of a pipe 7, and after contacting with the acid and converting the arsenic content into arsenious chloride, the unreacted hydrochloric acid in gaseous form, and substantially all of the arsenious chloride pass from the tower by a pipe 8 to a condenser 9.

The condenser may be cooled in any suitable manner, as for example, by water, and the arsenious chloride (AsCl₃) condensed therein passes therefrom along the uncondensed material by a pipe 10 to a trap 11. The trap 11 effects the separation of the condensed arsenious chloride from the uncondensed gas containing arsenious chloride and hydrochloric acid gas, and the condensed chloride is led from the trap by a conduit 31. The uncondensed material passes by a pipe 12 having a valved connection 33 to the adsorber 13 which may be filled with activated charcoal and in which substantially all of the arsenious chloride is adsorbed from the hydrochloric acid gas.

The hydrochloric acid gas then passes through a valved connection 34 and pipe 14 to a blower or fan 15 from whence it is returned to the tower or fan 3 for treating an arsenical liquid. There is thus established a circulation of the hydrochloric acid in a gaseous form and without dilution. This circulation entails a marked economy in that there is no loss of hydrochloric acid, and the amount utilized in converting the arsenic to arsenious chloride may be made up by admitting hydrochloric acid gas to the circulating fan by means of a pipe 17 which leads to a hydrochloric acid generator 16. The hydrochloric acid gas may be formed in the generator by reaction between liquid hydrochloric acid or a chloride and sulphuric acid. These materials may be introduced by means of pipes 39 and 40.

The sulphuric acid from which substantially all of the arsenic has been removed by treatment with hydrochloric acid in the treating tower passes from said tower through a pipe 4 to an air treater 5 and from thence to storage by means of a conduit 6. The air treater 5 may be dispensed with if desired and is utilized for the purpose of subjecting dearsenicated sulphuric acid to the action of a current of air, as by blowing air therethrough, in order to remove any small amount of arsenious chloride and of hydrochloric acid gas which may remain.

The process, as above outlined, while operating in a continuous manner during treatment with the halogen acid, is subject to interruption in the order to desorb the adsorbent material in the adsorber. Provision, however, may be made to obviate such interruption by providing a second adsorber 19, connected to pipe 12 by pipe 18, through which the gas stream passing from the trap may be led while the adsorbent material in adsorber 13 is being freed from the adsorbed arsenious chloride. Adsorber 19 is connected with pipe 14 through line 20. Desorption of the arsenious chloride can be carried out by passing a current of heated air, for example, at a temperature of about 212° F., through the adsorber. Such heated air may be supplied by an air heater 23 connected to the adsorber by means of a pipe 24 and a pipe 26 having a valved connection 35. The air current now containing arsenious chloride is led from the adsorber by means of a valved connection 32 and pipes 28 and 29 to a condenser 21, wherein arsenious chloride condenses to liquid form and is conducted to the trap by a connection 22. Similarly, when it is desirable to discontinue operation of the adsorber 19, by a closing of valves 30 and 36 and opening of valve 37 and valve 38 in connection 27, the adsorbent material may be desorbed by a current of heated air. The operation of the adsorber 13 is resumed by closing the valves 32 and 35, controlling the heated air stream, and opening valves 33 and 34 controlling the arsenious chloride and the hydrochloric acid gas stream.

There is thus accomplished a dearsenication of sulphuric acid by treatment countercurrently with hydrochloric acid gas whereby arsenious chloride is formed and passes from the treating vessel as a vapor along with unreacted hydrochloric acid gas. The arsenious chloride is separated from the hydrochloric acid gas by condensation, which is preferably in two stages; first, a cooling, and second, an adsorption; the hydrochloric acid gas is circulated in undiluted form with addition of hydrochloric acid gas thereto as required and arsenical sulphuric acid treated with such circulating gas.

The temperature conditions under which the process may be satisfactorily practiced are at a temperature at least above 150° F. and within the range of from about 150° F. to about 300° F. Although I have found that in the treatment of sulphuric acid the procedure is favorably affected by the utilization of an acid of about 66° Bé. strength, it will be understood that an acid of a higher or of a lower strength may be used.

It may also be observed that in this process of dearsenication the halogen acid gas other than that reacted to form the halide of arsenic, moves in a continuous cycle without dilution, whereas the arsenical liquid is subjected to a single pass treatment.

The invention accordingly provides an economical and practical method for the removal of arsenic from arsenical liquids, and a method which enables a halide of arsenic to be recovered in an essentially pure form. When applied to sulphuric acid, it makes possible the purification and marketing of a sulphuric acid which has hitherto only been marketed at a disadvantage. Furthermore, and specifically when applied to the treatment of a sulphuric acid of about 66° Bé. strength and containing approximately 0.40% arsenic, as As₂O₃, a purified product was obtained containing less than 0.0005% arsenic, as As₂O₃.

A halogen, for example fluorine or chlorine may also be utilized for dearsenicating liquids in place of the halogen acid as hydrofluoric acid or hydrochloric acid.

It will be understood that the reference in the claims to a "dispersed" stream of sulphuric acid is intended to include the separation of the acid stream into divided condition such, for example, as takes place when the acid is passed through a packed tower.

Since certain changes may be made in carrying out the above process without departing from the scope of the invention, it is intended that all matter contained in the above description shall be interpreted as illustrative and not in a limiting sense.

I claim:

1. A continuous process for the dearsenicating of sulphuric acid which comprises continuously circulating a gas of the group consisting of: hydrochloric and hydrofluoric acids, chlorine and fluorine, in intimate contact with a dispersed stream of sulphuric acid under elevated temperature conditions such that a halide of arsenic is formed and passes off as a vapor with the unreacted gas, thereby removing arsenical impurities from the sulphuric acid, cooling the stream of gas containing halide of arsenic so as to condense the major portion of the halide of arsenic, separating the condensed halide of arsenic from the circulating stream of gas, passing the circulating stream of gas containing residual halide of arsenic through an adsorbent to remove the residual halide of arsenic and passing the thus purified gas in contact with further amounts of sulphuric acid.

2. A continuous process for the dearsenicating of sulphuric acid which comprises continuously circulating a halogen acid gas of the group consisting of: hydrochloric and hydrofluoric acid gases, in countercurrent flow with a continuously flowing dispersed stream of sulphuric acid of 66° Baumé while maintaining said gas at a temperature of at least 150° F. so that a halide of arsenic is formed and passes off as a vapor with the unreacted halogen acid gas, thereby removing arsenical impurities from the sulphuric acid, cooling the stream of gas containing halide of arsenic so as to condense the major portion of the halide of arsenic, separating the condensed halide of arsenic from the circulating stream of gas, passing the circulating stream of gas containing residual halide of arsenic through an adsorbent to remove the residual halide of arsenic and passing the thus purified gas in contact with further amounts to sulphuric acid.

PAUL W. BACHMAN.